(12) United States Patent
Tsujino et al.

(10) Patent No.: US 6,424,501 B1
(45) Date of Patent: Jul. 23, 2002

(54) DISK DRIVE RAMP STRUCTURE HAVING INTEGRATED DISCRETE RIGID SUPPORT ELEMENTS FOR DATA STORAGE DEVICE

(75) Inventors: Hitoshi Tsujino; Keiichiro Yoshida, both of Fujisawa; Jun Ishikawa, Yokohama; Shinichi Kimura, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 65 days.

(21) Appl. No.: 09/606,851

(22) Filed: Jun. 29, 2000

(30) Foreign Application Priority Data

Jun. 29, 1999 (JP) .......................................... 11-183121

(51) Int. Cl.⁷ ................................................ G11B 5/54
(52) U.S. Cl. ................................................... 360/254.7
(58) Field of Search ........................... 360/254.3, 255.9

(56) References Cited

U.S. PATENT DOCUMENTS 6,160,686 A * 12/2000 Albrecht .................. 360/255.6

* cited by examiner

*Primary Examiner*—A. J. Heinz
(74) *Attorney, Agent, or Firm*—Robert B. Martin; Bracewell & Patterson, L.L.P.

(57) ABSTRACT

A ramp structure for a data storage device has a load/unload ramp and a disk attached to a spindle. The ramp structure has a first rigid support structure 52, a second rigid support structure 76 separated from the first rigid support structure, a bridge 78 that connects the first rigid support structure to the second rigid support structure, and ramp units 50 attached to the first rigid support structure. The rigid support structure has a thermal expansion coefficient selected so that the ramp-disk spacing is constant during changes in temperature. By placing the parts of the first rigid support structure 52 and the second rigid support structure sleeve 76 in an injection molding die and carrying out an insert molding, the ramp unit 50 has an accurate and stable size.

31 Claims, 9 Drawing Sheets

DISK DRIVE RAMP STRUCTURE HAVING INTEGRATED DISCRETE RIGID SUPPORT ELEMENTS FOR DATA STORAGE DEVICE

TECHNICAL FIELD

The present invention generally relates to a computer hard disk drive using rotating disks and other data storage devices. More specifically, it is related to a load/unload ramp structure for keeping a magnetic head away from the data storage disk when the disk is not rotating.

DESCRIPTION OF THE RELATED ART

A computer hard disk drive typically uses several disks that rotate at high speed. Each disk has a coating of magnetic data storage material and is paired with a magnetic read/write head held very close to the disk surface. The magnetic read/write heads read data from and write data to its respective magnetic disk while the disk is rotating. The magnetic head is prevented from contacting with the magnetic disk surface by an air cushion generated by the moving disk. Usually, the magnetic head flies above the rotating disk by about 0.02 micron.

Since both the disk surface and the magnetic head can be destroyed if the magnetic head and the disk surface come into contact with each other for a long time, it is important that contact between them be avoided for such a time period. If there is excessive contact between them, data may be permanently destroyed. In the operating hard disk drive, the high rotational speed of the disk prevents the contact.

It is also important that the magnetic head and the disk surface do not contact each other when the disk is not rotating (that is, when power is not supplied to the hard disk drive). If the disk and the magnetic head make contact while the disk is stationary, the head and the disk surface may stick together, causing the disk surface to be damaged when the disk starts to rotate. Moreover, the disk must begin moving from a standstill, and a certain minimum speed is required for the magnetic head to float above the magnetic disk surface. Accordingly, the friction between the magnetic head and the disk surface remains until the disk reaches sufficient speed to form an air cushion whenever the hard disk drive is started.

For these reasons, some prior art hard disk drives employ a load/unload ramp structure, in which the magnetic head is kept away from the disk surface while the hard disk drive is not operating. The magnetic head is released from the ramp structure when the minimum speed for the disk to cause the magnetic head to fly above the magnetic disk surface is attained.

In addition, some hard disk drives have nonstick disks so that the magnetic head is not damaged even when the head remains in contact with the nonstick surface for an extended period of time. This type of hard disk drive is known as a contact start/stop (CSS) hard disk drive. The CSS hard disk drive does not use a load/unload ramp structure.

Figure 1:
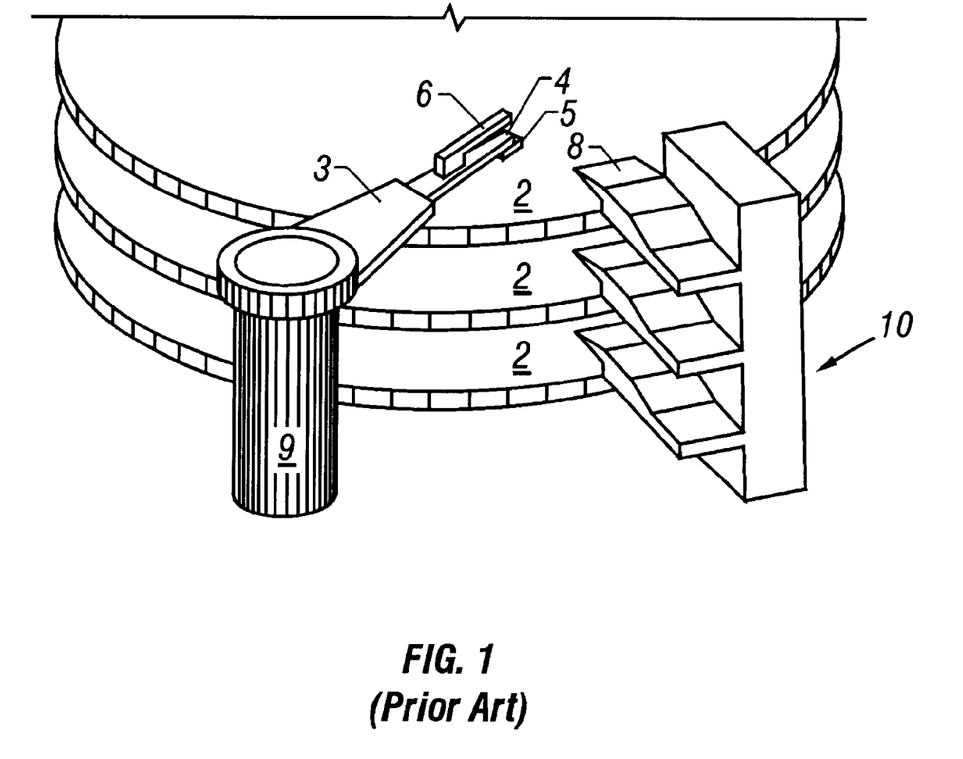
FIG. 1 is a perspective view of prior art, conventional hard disk drive and load/unload ramp structure.

FIG. 1 shows a typical hard disk drive of the prior art including three disks 2. An actuator arm 3 supports a suspension 4, a slider 5, and a lift feature 6. On the underside of the slider 5, a magnetic read/write head (not shown) is arranged. The actuator arm 3 rotates around a pivot column 9. The lift feature 6 is placed on the suspension 4 so as to engage with a ramp 8 on a ramp structure 10. A ramp 8 applies an upward force to the lift feature 6 to lift the slider 5 and the magnetic head from a disk 2. This prevents the magnetic head from contacting with the disk 2 when the lift feature 6 moves onto the ramp 8.

The ramp structure 10 is preferably made of a low-frictional macromolecular material. The low-frictional ramp 8 decreases the amount of energy necessary for unloading; the magnetic head (during the unloading in which power is off), and also reduces the amount of dust particles caused when the lift feature rubs against the ramp surface. Further, the position of the ramp structure relative to the disk surface is preferably fixed solidly.

The ramp structure 10 made of a macromolecular material often has a thermal expansion coefficient which is quite different from the thermal expansion coefficient of the surrounding metal parts that are usually made of aluminum or stainless steel. Accordingly, when the temperature changes, the plastic ramp structure expands and contracts at a rate different from the surrounding parts, and as a result, the position of the ramp structure 10 relative to the disk 2 will shift. The positional shift due to thermal expansion causes the disk surface area usable for data storage to be reduced. In addition, the positional shift due to thermal expansion the alignment tolerance between the ramp 8 and the disk 2 to be relaxed, and thus the vertical spacing between the disks needs to be made larger. This solution has an undesirable result of reducing the number of disks in the hard disk drive of a given size.

SUMMARY OF THE INVENTION

A data storage device has disks attached to a spindle and a load/unload ramp structure. The ramp structure has a first rigid support structure, a second rigid support structure separated from the first rigid support structure, a bridge for connecting the first rigid support structure to the second rigid support structure, and ramp units attached to the first rigid support structure. The rigid support structure has a thermal expansion coefficient selected so that the ramp-disk spacing is constant during changes in temperature. This ramp structure is easier to manufacture and the positional shift due to thermal expansion of the load/unload ramp is averaged as a whole.

DETAILED DESCRIPTION OF THE PREFERRED EMBODIMENT

Japanese Patent Application No. 11-120824 (a Japanese patent application corresponding to U.S. patent application Ser. No. 09/079,225 filed in the U.S. on May 14, 1998, Applicant's Reference No. AM998022, now U.S. Pat. No. 6,160,686) is an earlier filed application to the present application, has not been laid open, and is assigned to the same applicant as that of the present application. The following ramp structure is provided in that application:

1) Positional shift due to thermal expansion of the load/unload ramp is reduced;
2) The advantage of using a ramp made of a macromolecular material is maintained;
3) Mechanical tolerance in the positional alignment between the ramp and the disk is made severe; and
4) Attachment to the base of a hard disk drive is easily and accurately performed.

It is an object of the present invention to improve the invention described in Japanese Patent Application No. 11-120824.

Figure 2:
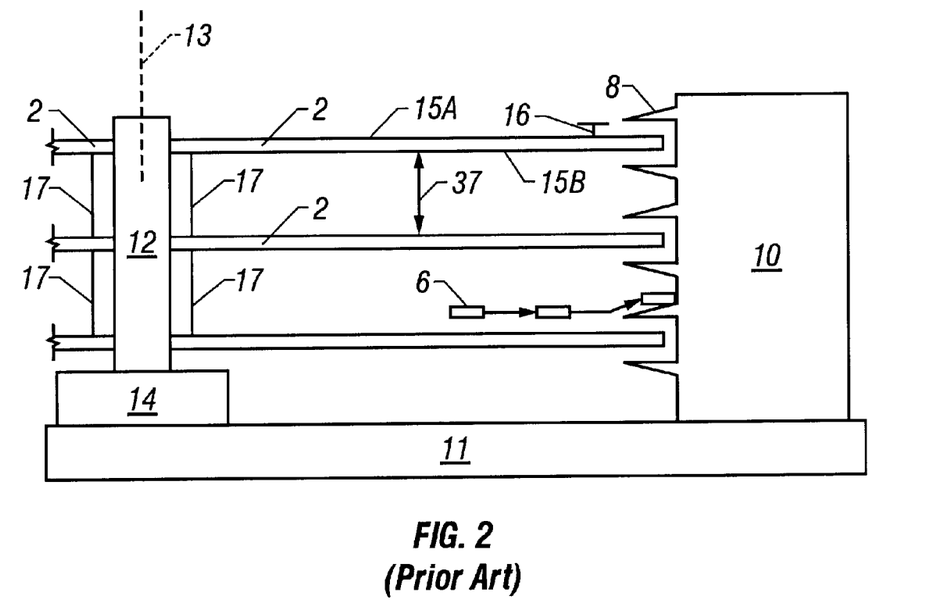
FIG. 2 is a side view of the conventional hard disk drive and load/unload ramp structure of FIG. 1.
Figure 3:
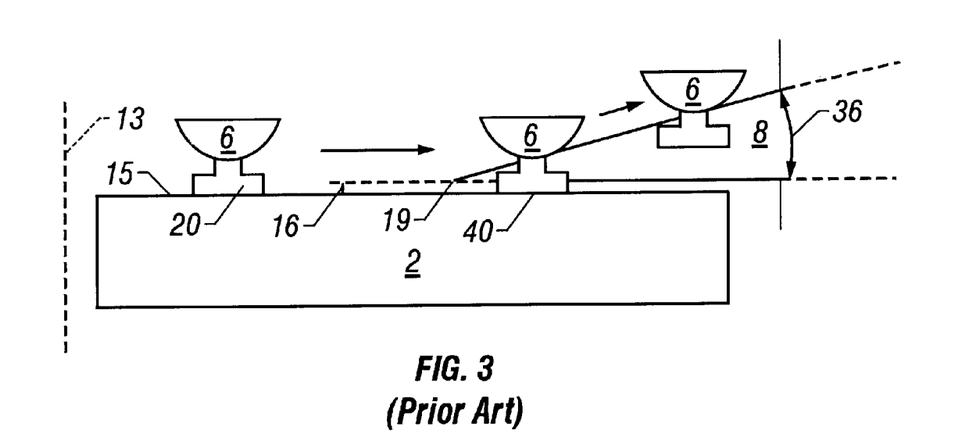
FIG. 3 is an enlarged schematic end view showing how the load/unload ramp of FIG. 1 works.
Figure 4:
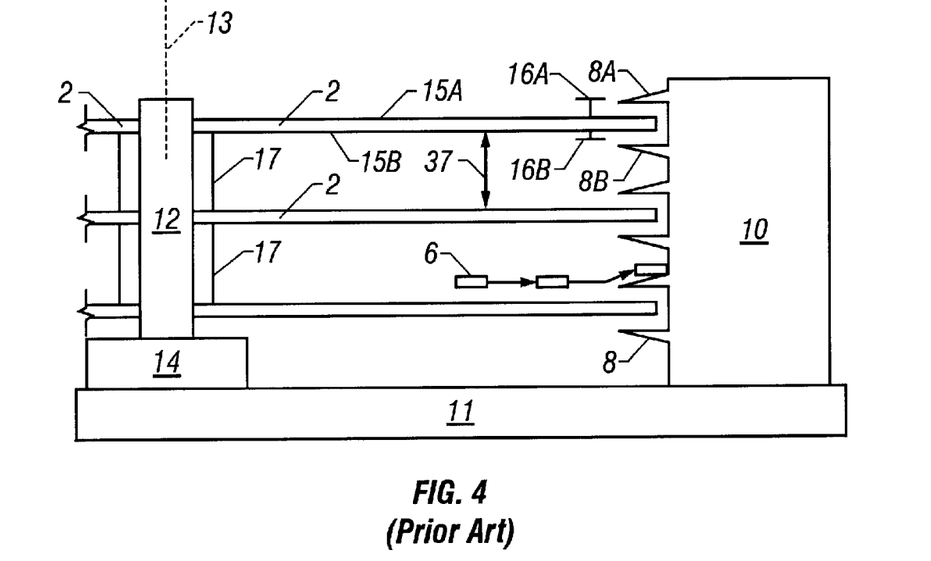
FIG. 4 is a side view of the hard disk drive of FIG. 1 illustrating a positional shift problem caused by thermal expansion in the-load/unload ramp.

FIGS. 2–4 show the problems unique to said ramp structure, which is made of a macromolecular material. FIG. 2 shows the ramp structure 10 attached to the base 11. A spindle 12 having a rotating axis 13 is connected to a motor 14, and the motor 14 is connected to the base 11. The motor 14 rotates the spindle 12 around its rotating axis 13. Data storage disks 2 are attached to the spindle 12. Each disk 2 has an upper disk surface 15A and a lower disk surface 15B. The ramp structure 10 provides one load/unload ramp 8 for each disk surface 15. Each disk surface 15 and the ramp 8 define a ramp-disk spacing 16. A spacer ring 17 is positioned between the disks 2, thereby helping define a disk spacing 37 between the disks 2.

FIG. 3 is an enlarged view of the ramp 8 and the lift feature 6. The lift feature 6 is designed so that it is raised by the ramp 8 when it moves away from the spindle 12 in the radial direction. A ramp end 19 is closer to the disk surface 15 than the lift feature 6, and thus the lift feature 6 contacts with the upper surface of the ramp 8. In this configuration, the uncertainty of the positions of the ramp 8 and the lift feature 6 must be taken into account. A magnetic head 20 is attached to the lift feature 6, and accordingly, the magnetic head is raised from the disk surface 15 when the lift feature is put in contact with the ramp 8.

The ramp 8 is arranged above the disk surface 15. The distance between the ramp and the disk surface defines the ramp-disk spacing 16. The ramp 8 usually has a slope 36 of about 1/4 or 15 degrees relative to the disk surface 15. The position of a landing radius 40 depends on the ramp-disk spacing 16, the slope 36, and the radial direction of the ramp 8. The landing radius 40 is the outermost radius for which the magnetic head 20 and the disk surface 15 are close enough to each other to fully interact. The position of the landing radius determines the outmost radius for which data can be stored. Data cannot be stored at a radial position outside the landing radius 40.

The position of the landing radius 40 changes as the ramp-disk spacing 16 changes. The landing radius 40 approaches the spindle axis 13 as the ramp-disk spacing 16 increases, and moves away from the spindle axis 13 as the ramp-disk spacing 16 decreases. For the ramp having a slope of 1/4, the radial movement of the landing radial position 40 is 4 times the change in the ramp-disk spacing 16. When the ramp-disk spacing changes, the outmost radius for which data can be stored changes. Data must always be stored closer to the spindle 12 than the minimum possible radius of the landing radius 40. Accordingly, the surface area in which data can be stored decreases as the radial uncertainty of the landing radial position 40 increases. To maximize the data capacity and increase the reliability of the hard disk drive operation, it is important to fix and clarify the ramp-disk spacing 16. For instance, the ramp-disk spacing 16 must not largely change when the temperature changes.

If the ramp-disk spacing 16 varies by temperature changes, the disk spacing 37 must be made larger. This is because the ramp 8 must be large enough to positively intercept the lift feature 6. If the disk spacing 37 is large, the number of disks storable in a predetermined volume decreases, and thus, the data capacity per unit volume reduces.

Table 1 shows the thermal expansion coefficients of aluminum and steel which are commonly used for the spindle 12, motor 14, spacer ring 17, and disks 2, and of other parts mechanically connected to the disks 2.

| Material | Thermal expansion coefficient ($\times 10^{-6}$/degree) |
|---|---|
| Aluminum | 22–23 |
| Glass | 7–7.5 |
| Stainless steel (400 s) | 11–12 |
| Stainless steel (300 s) | 16–18 |

In Table 2, the thermal expansion coefficients of the plastics used for the ramp structure are shown. The copolyester of 4-hydroxybenzoic acid and 6-hydroxy-2-naphtoic acid (HAHN) is commercially available as a product name of VECTRA A430® from Hoechst-Celanese, Inc®. HAHN is a liquid crystal material having a low coefficient of friction and excellent abrasion characteristics. It is noted that HAHN has a highly anisotropic thermal expansion coefficient, and thus has two thermal expansion coefficients.

| Material | Thermal expansion coefficient ($\times 10^{-6}$/degree) |
|---|---|
| HAHN | –2–5 (vertical direction) or 65–80 (horizontal direction) |
| Polyacetal | 75–85 |
| Polyetherether ketone (PEEK) | 40–50 |

-continued

| Material | Thermal expansion coefficient ($\times 10^{-6}$/degree) |
|---|---|
| Polyimide | 31–50 |
| Polyetherimide | 40–50 |

FIG. 4 shows the effect of the temperature rise for the background art ramp structure. The spindle 12, motor 14, spacer ring 17, and data storage disks 2 are made of metals (or ceramics or glass), and accordingly, they have relatively small thermal expansion coefficients. The ramp structure 10 is made of plastic, so it has a relatively large or variable thermal expansion coefficient. As a result, the ramp 8 moves upwards from the disk 2 during a temperature rise, which causes a positional shift. This change in the relative height is mainly due to the low expansion rate of the spindle 12 as compared with the high expansion rate of the ramp structure 10. The change in the relative height is maximized at the farthest disk from the base 11. The ramp-disk spacing 16A between the load/unload ramp 8A on the upper surface side and the upper disk surface 15A increases. The ramp-disk spacing 16B between the load/unload ramp 8B on the lower surface side and the lower disk surface 15B decreases. With this, the landing radius of the upper disk surface 15A approaches spindle 12. The landing radius of the lower disk surface 15B becomes farther from the spindle 12. The position of the landing area of every disk surface moves depending on the relative change in the height between the disk surface 15 and the load/unload ramp 8.

Figure 5:
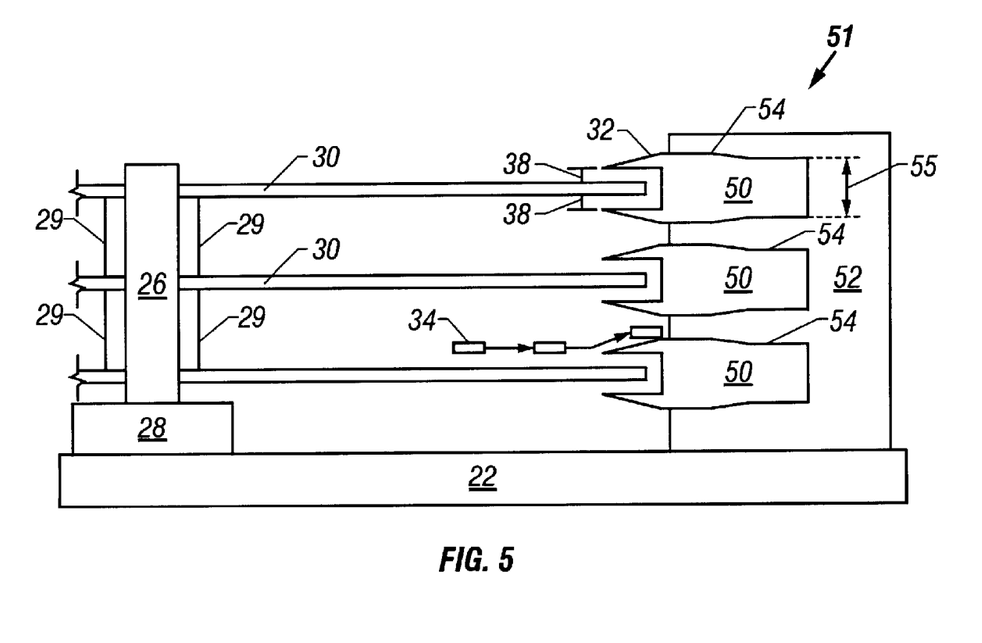
FIG. 5 is a side view of a hard disk drive having a ramp structure according to the preferred embodiment of Japanese Patent Application No. 11-120824, and U.S. patent application Ser. No. 09/079,225, now U.S. Pat. No. 6,160,686.

FIG. 5 shows the preferred embodiment of a ramp structure 51 by Japanese Patent Application No. 11-120824. Ramp units 50 each having a pair of load/unload ramps 32 are attached to the rigid support structure 52 attached to the base 22. The ramp units 50 and the rigid support structure 52 include the ramp structure according to the present invention. Each ramp unit 50 is preferably a separate material piece (that is, the ramp units 50 are not connected to each other). Further, the ramp units 50 have a minimum vertical range 55. In one embodiment, the material of the rigid support structure 52 is selected so that it has a thermal expansion coefficient that strictly matches the thermal expansion coefficient of the spindle 26. The spindle 26, spacer ring 29, disks 30, and rigid support structure 52 are preferably made of the same material. Alternatively, the spindle 26, spacer ring 29, disks 30, and rigid support structure are made of different materials having substantially equal thermal expansion coefficients. Since the ramp units are not connected to each other by a plastic material, the ramp units 50 move by the expansion and contraction of the rigid support structure 52 during changes in temperature. Further, since the ramp units have the small vertical range 55, the thermal expansion movement of the rigid support structure 52 is more dominant than the thermal expansion movement of the ramp 32.

Since the spindle 26 and the rigid support structure 52 expand and contract at the same rate, the ramp-disk spacing 38 is substantially constant for all the disk surface/ramp pairs over a wide temperature range. The ramp-disk spacing 38 is constant even on the farthest disk from the base 22 during changes in temperature.

More generally, the rigid support structure 52 can be made of a material selected so that it has a thermal expansion coefficient that makes the ramp-disk spacing 38 constant during changes in temperature. In most drive units, this is accomplished by making the thermal expansion coefficients of the rigid support structure 52 and the spindle 26 (to which the disks 30 are attached) coincide with each other. However, the thermal expansions of other portions such as the motor 28, spacer ring 29, or the disk itself may affect the displacement of the disk 30 during changes in temperature.

Accordingly, the thermal expansion coefficient of the rigid support structure 52 need not be strictly equal to the thermal expansion coefficient of the spindle 26. Instead, the thermal expansion coefficient of the rigid support structure 52 can be made to match the composite thermal expansion coefficient of the spindle 26, spacer ring 29, disk 30, and motor 28. Other components having an effect on the thermal expansion movement of the spindle 26, motor 28, spacer ring 29, and disk 30 can be deemed to be part of the whole drive assembly. It should be noted that the whole drive assembly includes components that have an effect on the thermal expansion s displacement of the disk 30, and hence on the ramp-disk spacing 38. The individual data storage devices may include components other than the spindle, spacer ring, disk, and motor, which affect the thermal expansion displacement of the disk 30.

The disk 30 used in the hard disk drive comprises a plate of a material (usually, aluminum, but glass may be used) coated with a thin film of a magnetic data storage material. Another coating may be used. The thermal expansion coefficient of the disk 30 having such coating substantially completely depends on the material of the plate rather than the material of the coating arranged on the plate.

It is to be noted that if the base is not uniform in thickness, the base 22 may affect the thermal expansion change of the ramp-disk spacing 38. For instance, if the base 22 is thicker under the spindle 26 and the motor 28 than under the ramp structure 51, the thermal expansion of the base 22 has an effect on the ramp-disk spacing 38.

A data storage device such as a hard disk drive is usually designed to operate in a temperature range of 0–70° C. Accordingly, the ramp-disk spacing 38 must be relatively constant in this temperature range. The ramp-disk spacing relatively constant over this temperature range can be realized by the ramp structure 51 of the present invention.

In the particularly preferred embodiment, the rigid support structure 52 is made of aluminum, and the spindle 26 is also made of aluminum. Alternatively, the spindle 26 and the rigid support structure 52 are made of stainless steel.

In some hard disk drives, the disk 30 made of glass may be used. Glass has a thermal expansion coefficient that substantially matches stainless steel. Accordingly, if the glass disk is used, the spindle 26, spacer ring 29, and rigid support structure 52 can be made of stainless steel.

However, the spindle 26 and the spacer ring 29 have a much greater effect on the thermal expansion movement of the disk 30. Accordingly, by causing the thermal expansion coefficients of the spindle 26 and the spacer ring 29 to match the thermal expansion coefficient of the rigid support structure 52, the change in the ramp-disk spacing 38 due to thermal expansion can be made smaller than the conventional ramp structure.

Figure 6:
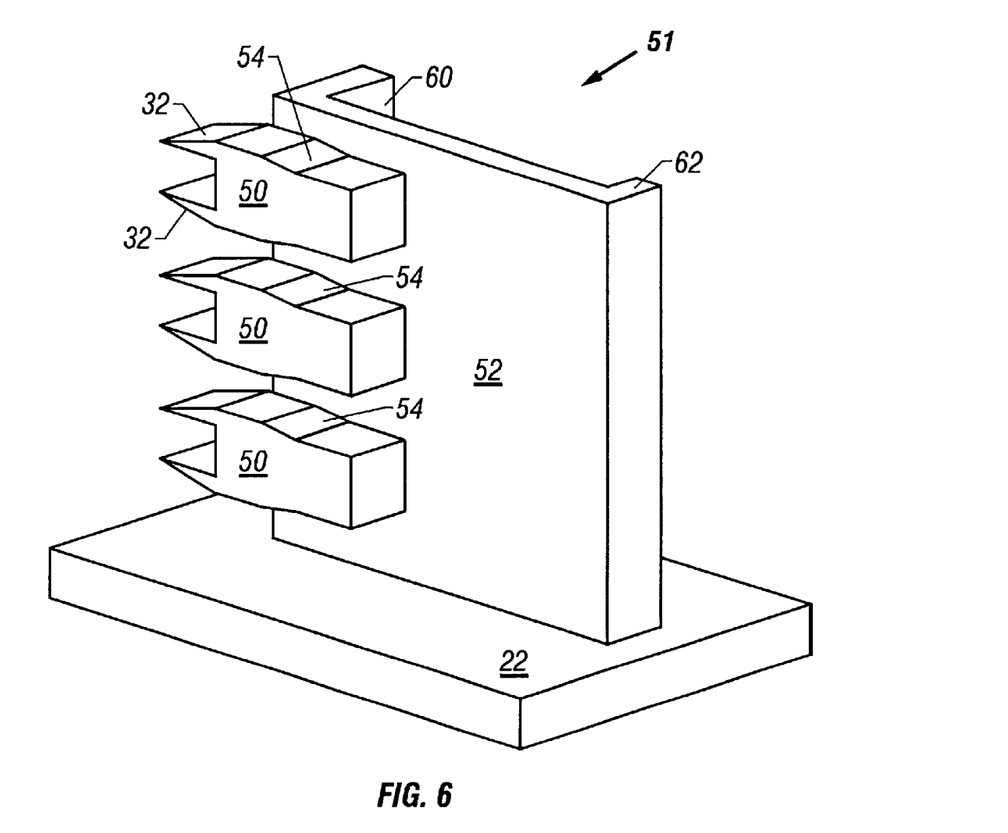
FIG. 6 is a perspective view of the ramp structure in the hard disk drive of FIG. 5.

FIG. 6 shows an enlarged view of the ramp structure 51 of Japanese Patent Application No. 11-120824. Three ramp units 50 are attached to the side of the rigid support structure 52. The ramp structure shown in FIG. 6 has six load/unload ramps 32 (two for each ramp unit 50), and thus it is suitable for use with a hard disk drive having three disks. However, to the rigid support structure 52, a substantially limitless number of ramp units 50 can be connected.

The ramp unit 50 preferably has a standby keeping surface 54 sloped so that the lift feature 34 is held at the standby position. Using the standby keeping surface 54 in the ramp structure is well known in the field of the hard disk drive structure.

The ramp unit 50 is fabricated from a plastic that has a low coefficient of friction and good abrasion characteristics (low particle generation). The examples of such material include liquid crystal polymers such as copolyester of 4-hydroxybenzoic acid and 6-hydroxy-2-naphtoic acid (HAHN), polyetherether ketone (PEEK), polyimide, and polyacetal. To decrease friction and abrasion, a PTFE-filled plastic can be used. In a certain preferred embodiment, the ramp unit 50 is made of an injection-molded liquid crystal polymer such as HAHN, which is commercially available as a product name of VECTRA A430 from Hoechst-Celanese, Inc.

In Japanese Patent Application No. 11-120824, the rigid support structure 52 preferably has flanges 60 and 62 for increasing the rigidity of the rigid support structure 52, but these are not always be required. However, the high rigidity is useful for maintaining the accurate positioning of the ramp unit 50 relative to the disk 30.

Figure 7:
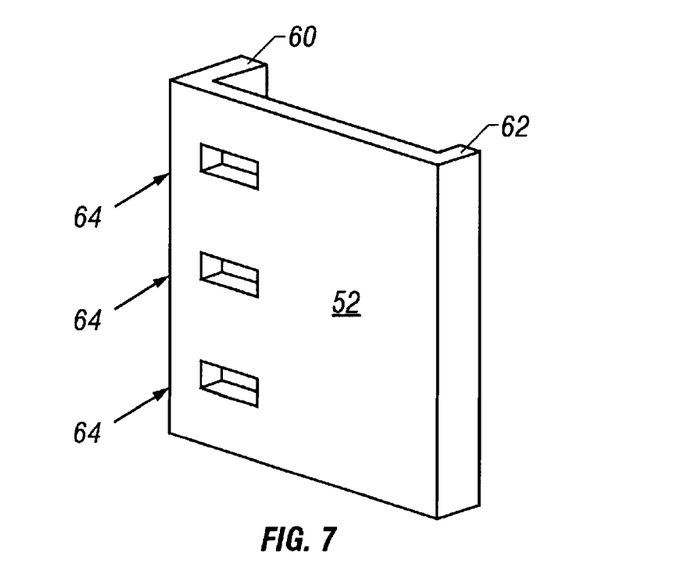
FIG. 7 is a perspective view of the rigid support structure of the ramp structure of FIG. 6.

FIG. 7 shows the preferred embodiment of the rigid support structure 52 in Japanese Patent Application No. 11-120824. The rigid support structure 52 preferably has holes 64 for mechanically connecting the ramp units 50.

Figure 8:
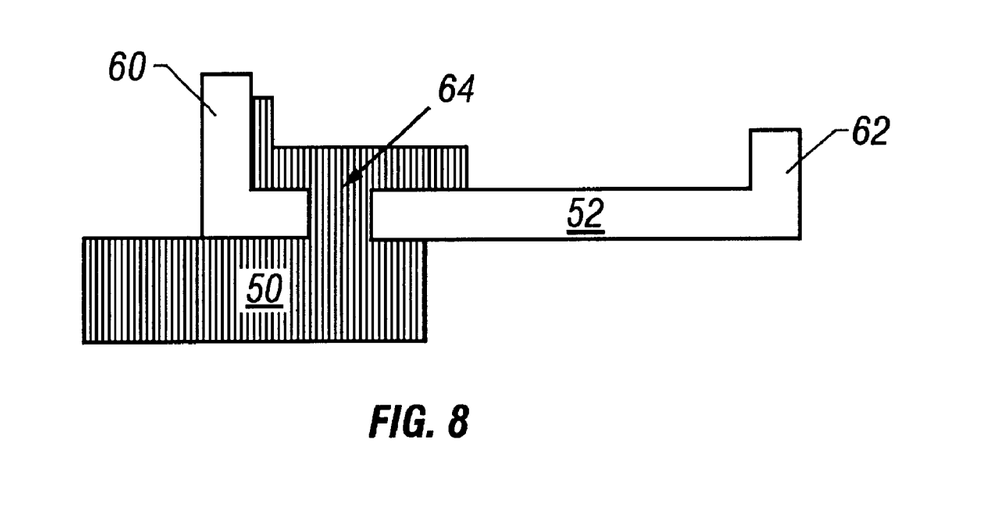
FIG. 8 is a vertical sectional view of the ramp structure of FIG. 6 showing attachment of the rigid support structure.

FIG. 8 shows a cross-sectional view of the rigid support structure 52 and the ramp unit 50 in Japanese Patent Application No. 11-120824. The ramp unit passes through the hole 64 thereby to mechanically connect to the rigid support structure 52. This is a preferred means for attaching the ramp unit to the rigid support structure 52.

Figure 9:
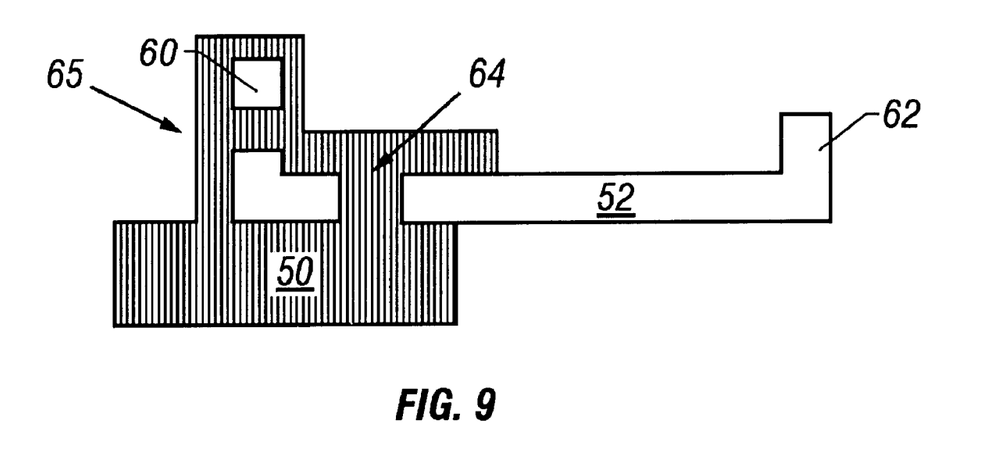
FIG. 9 is a vertical sectional view of the ramp structure of FIG. 6 showing an alternate attachment of the rigid support structure.

Alternatively, as shown in FIG. 9, the flange 60 can be surrounded with the ramp unit 50 to increase the mechanical stability. It is noted that a plurality of holes 64 can be provided in each ramp unit 50. For instance, each ramp unit 50 can also be mechanically connected to another hole 65 in the flange 60.

Instead, in Japanese Patent Application No. 11-120824, the ramp unit 50 can also be attached to the rigid support structure 52 by screws. This is not desirable, because screws cause plastic deformation of the ramp unit 50, and finally a positional shift.

In Japanese Patent Application No. 11-120824, an alternative method is to attach the ramp unit 50 by a snap-fitting structure in which it is fitted into the holes 64 and 65. A further alternative method is to attach the ramp unit to the rigid support structure 52 by a heat caulking technique.

Figure 10:
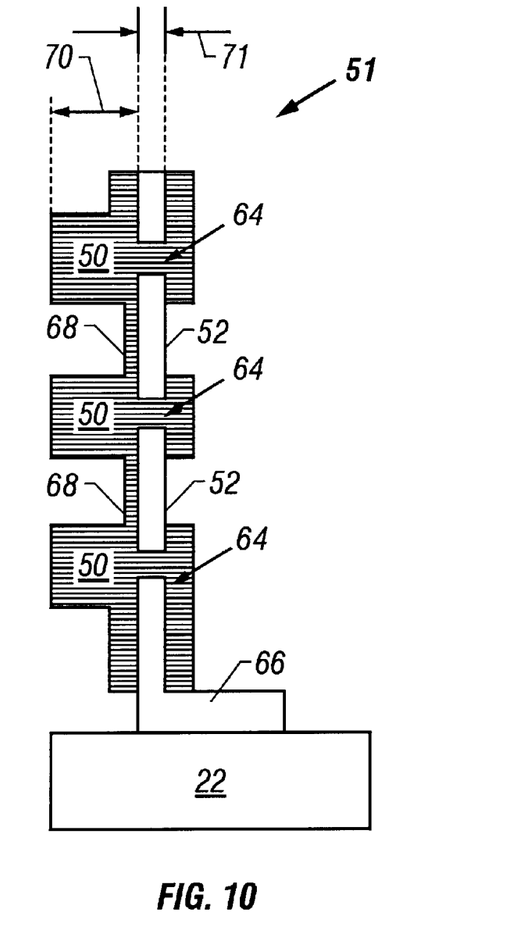
FIG. 10 is a sectional side view of the ramp structure of FIG. 6.

FIG. 10 shows a sectional side view of a ramp structure 51 in Japanese Patent Application No. 11-120824, in which the ramp units 50 and the holes 64 are cut in the vertical direction. In Japanese Patent Application No. 11-120824, the rigid support structure 52 preferably has a foot 66 for facilitating the attaching of the ramp structure 51 to the base 22. The foot 66 extends vertically to the rigid support structure 52. Between the ramp units 50, thin layers 68 of a plastic ramp unit material can be provided. The thin layers 68 must be thinner than the thickness 70 of the ramp units and the thickness 71 of the rigid support structure 52. By limiting the layers 68 to be thin, the ramp units 50 are mechanically connected mainly by the rigid support structure 52. As a result, the ramp units 50 move according to the thermal expansion coefficient of the rigid support structure 52 during changes in temperature.

Figure 11:
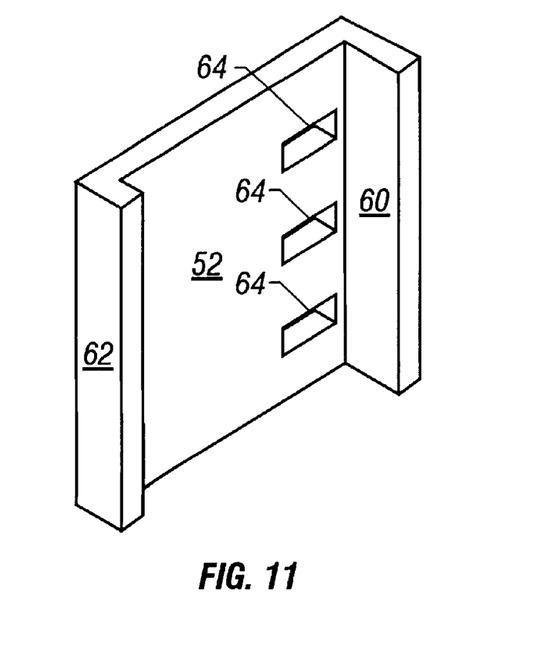
FIG. 11 is a perspective rear view of the rigid support structure of FIG. 7.

FIG. 11 is a perspective rear view of the rigid support structure of Japanese Patent Application No. 11-120824.

Figure 12:
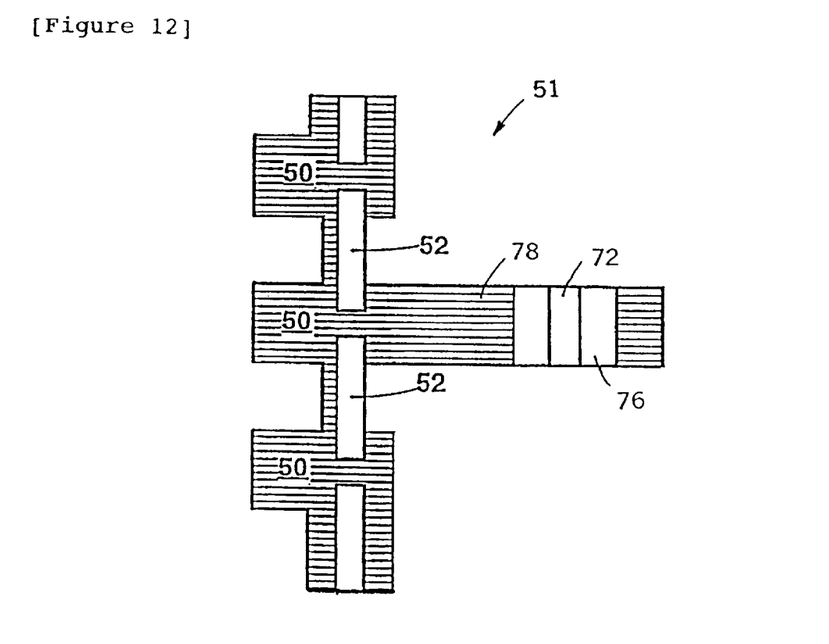
FIG. 12 is a sectional side view of a ramp structure constructed in accordance with a preferred embodiment of the present invention.

FIG. 12 shows a sectional side view of the rigid support structure 52 according to the preferred embodiment of the present invention. The bridge 78 is clearly seen. In addition to the rigid support structure 52, a new rigid support structure sleeve 76 separated through the bridge 78 is seen. The rigid support structure sleeve 76 has a hole portion 72 for receiving a screw or bolt.

In this configuration, the rigid support structure 52 corresponds to the "first rigid support structure," and the new rigid support structure sleeve 76 corresponds to the "second rigid support structure."

In the ramp structure 51 according to the present invention, the rigid support structure 52 that is the "first rigid support structure" can be made by punching and molding from a plate-like material which is continuous in the four directions. That is, using only a sheeting process can also fabricate it. If the flanges 60 and 62 are not provided, the fabrication becomes easier. Further, the rigid support structure sleeve 76 that is the "second rigid support structure" can be made by cutting from a hollow cylindrical material which is continuous in one direction. In addition, using only a latching process can al,so make it.

In the typical embodiment, the rigid support structure 52 and the rigid support structure sleeve 76 are placed in an injection molding machine, and a plastic ramp unit material is poured around the rigid support structure 52 and the rigid support structure sleeve 76. The ramp unit material is poured into the holes 64 and 65 for mechanically connecting the rigid support structure 52. Placing the parts such as the rigid support structure 52 and the rigid support structure sleeve 76 in an injection molding die is well known as "insert molding" in the injection molding process. The insert molding allows the formation of the ramp units 50 having an accurate and stable size.

In the insert molding, it is only needed that the rigid support structure 52 and the rigid support structure sleeve 76 are placed separately from each other in an injection molding machine or injection molding die, without previously connecting each part. That is, after the insert molding, the rigid support structure 52 and the rigid support structure sleeve 76 are connected through the interposition of the bridge 78.

As a matter of fact, to previously connect the rigid support structure 52 and the rigid support structure sleeve 76 before the insert molding requires extra works such as welding. Further, in the machining, it is extremely difficult to severely control the mutual positioning accuracy of them. This is not suitable for mass production.

In addition, the rigid support structure 52 and the rigid support structure sleeve 76 may be made by die casting, extrusion, molding, or machining. Further, on condition that the rigid support structure has a proper thermal expansion coefficient, the rigid support structure can be fabricated with a plastic material or a ceramic material. If the rigid support structure is made of a plastic material, the composition of the plastic material can be adjusted to provide the rigid support structure having a predetermined thermal expansion coefficient. For instance, glass-filled plastic or carbon-filled plastic can be used.

Although the rigid support structure is shown in the figure as having a flat plane shape, which is easy to make, the rigid support structure of another shape may be used. For instance, the rigid support structure having the shape of a block or a cylinder can be used.

Figure 13:
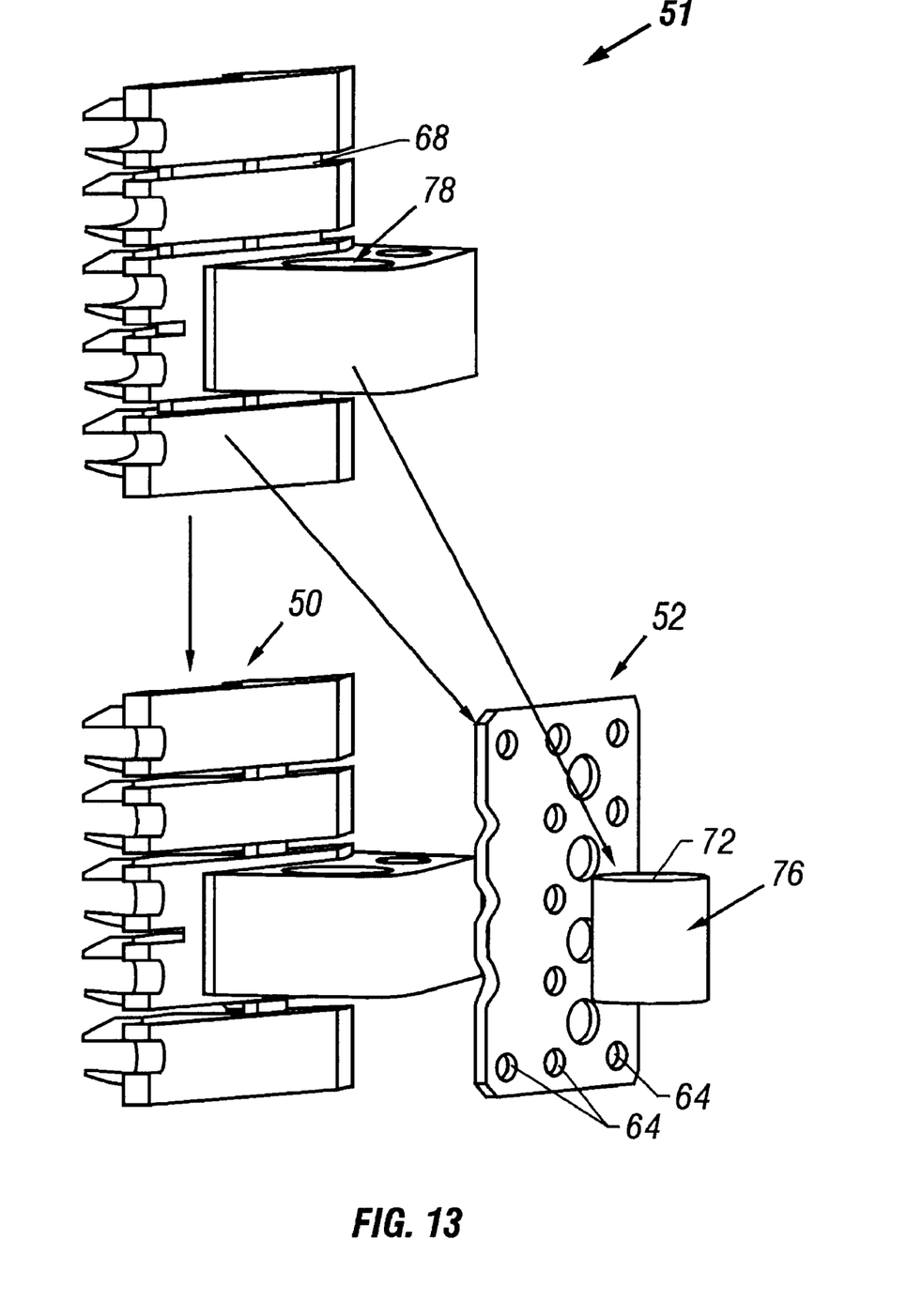
FIG. 13 is a perspective view of the ramp structure of FIG. 12.

FIG. 13 is a perspective view of the ramp structure 51 according to the preferred embodiment. It has a shape that is more suitable for practical use. The ramp structure 51 shown in FIG. 6 has six load/unload ramps 32 (two for each ramp unit 50), and thus, it is suitable for use with a hard disk drive having three disks. The ramp structure 51 shown in FIG. 13 has 10 load/unload ramps 32 (two for each ramp unit 50), and accordingly, it is suitable for use with a hard disk drive having five disks.

Figure 14:
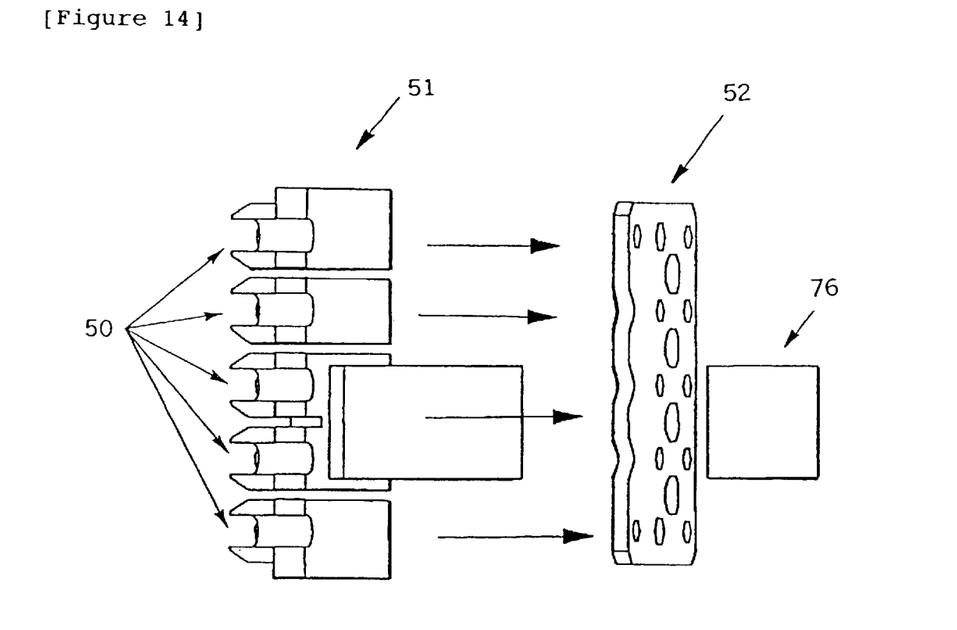
FIG. 14 is a perspective view of the ramp structure of FIG. 12.

FIG. 14 is a perspective view of the ramp structure 51 according to the preferred embodiment. The view angle is changed from the perspective view shown in FIG. 13. It is seen that for each ramp unit 50, the rigid support structure. 52 exists as a basic framework, and the rigid support structure sleeve 76 exists as another basic framework separated from the rigid support structure 52. Further, by boring multiple holes 64, weight reduction can be,achieved. Moreover, by connecting the surface and the rear of the rigid support structure 52 at many portions, the mechanical connection can be made stronger.

Figure 15:
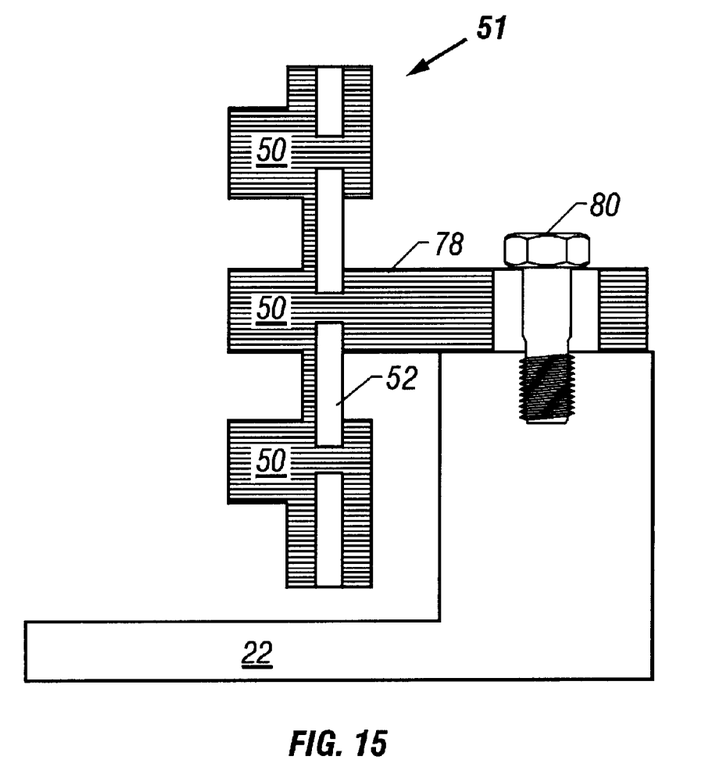
FIG. 15 is a sectional side view showing the state in which the ramp structure of FIG. 12 is attached to a base in a preferred manner.

FIG. 15 shows a sectional side view of the ramp structure 51 of the present invention, which is fixed to the base 22 by a screw 74. In this case, it has six load/unload ramps 32 (two for each ramp unit 50). The respective ramp units 50 are arranged symmetrically with respect to the upward and downward directions as much as possible. With this, as shown in FIG. 4, by taking advantage of the feature that the relative height change is maximum at the farthest disk from the base 11, the positional shift of the load/unload ramp due to thermal expansion is dispersed upwards and downwards, whereby it is totally averaged.

This is one of the reasons for the bridge 78 being formed in line with the central ramp unit 50 with respect to the direction in which a positional shift due to thermal expansion is caused. However, the bridge 78 needs a predetermined thickness, because it must support each ramp unit 50 as a cantilever beam.

It is obvious that the positional shift of the load/unload ramp due to thermal expansion is caused mainly by the rigid support structure 52, if the rigid support structure 52 and the rigid support structure sleeve 76 are compared. However, the rigid support structure sleeve 76 has a predetermined thickness in the direction in which the positional shift occurs. Accordingly, the thermal expansion coefficient of the rigid support structure 52 and the thermal expansion coefficient of the rigid support structure sleeve 76 can be made substantially equal, for instance, by using the same material. That is, the positional shift of the load/unload ramp due to,thermal expansion can be improved a little.

Figure 16:
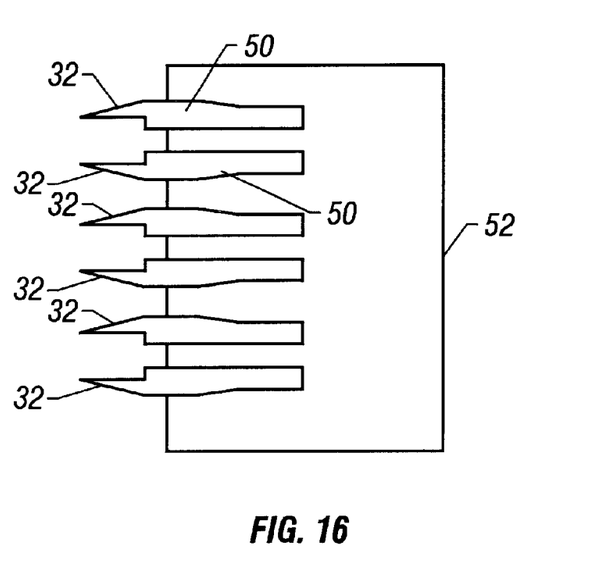
FIG. 16 is a side view of an alternate embodiment of the ramp structure of FIG. 12, in which the ramp unit has a single ramp.

FIG. 16 shows an embodiment in which each ramp unit 50 has a single ramp 32. In this case, each ramp unit 50 having a single ramp 32 is independently attached to the rigid support structure 52. By independently attaching each ramp to the rigid support structure 52, the change in the ramp-disk spacing 38 due to thermal expansion further decreases. However, this embodiment is not desirable, because independently attaching the ramps increases the manufacturing cost of the ramp structure 51.

Although the present invention has been shown for the case in which there are provided three ramp units and six ramps, and for the case in which there are five ramp units and ten ramps, it is to be understood that a substantially limitless number of ramp units or ramps may be attached to the rigid support structure.

What is claimed is:

1. A load/unload ramp structure for a data storage device having a data storage disk, the ramp structure comprising:
   at least one ramp unit having a load/unload ramp, the load/unload ramp and the data storage disk defining a ramp-disk spacing therebetween;
   a first rigid support structure to which said at least one ramp unit is attached;
   a second rigid support structure separated from said first rigid support structure;
   a bridge connecting said first and second rigid support structures; and wherein
   said first rigid support structure is made of a material having a thermal expansion coefficient selected so that the ramp-disk spacing is substantially constant during changes in temperature.

2. A ramp structure as set forth in claim 1, wherein the first rigid support structure has a thermal expansion coefficient that is substantially equal to that of a spindle of the data storage device.

3. A ramp structure as set forth in claim 1, wherein the first rigid support structure is made of the same material as a spindle of the data storage device.

4. A ramp structure as set forth in claim 1, wherein the first rigid support structure has a thermal expansion coefficient that is substantially equal to that of the disk.

5. A ramp structure as set forth in claim 1, wherein the first rigid support structure is made of the same material as the disk.

6. A ramp structure as set forth in claim 1, wherein said at least one ramp unit is made of a material selected from the group consisting of polyimide, polyacetal, PEEK, HAHN, liquid polymer, and PTFE-filled plastic.

7. A ramp structure as set forth in claim 1, wherein the first rigid support structure is made of a material selected from the group. consisting of aluminum, steel, stainless steel, ceramic, plastic, glass-filled plastic, and carbon-filled plastic.

8. A ramp structure as set forth in claim 1, wherein said at least one ramp unit and the first frigid support structure are cantilevered on the bridge.

9. A ramp structure as set forth in claim 8, wherein the bridge is centrally located relative to the first rigid support structure and aligned with a central ramp unit.

10. A ramp structure as set forth in claim 1, wherein said at least one ramp unit is injection-molded.

11. A ramp structure as set forth in claim 1, wherein each ramp unit includes a separate material piece.

12. A ramp structure as set forth in claim 1, wherein the second rigid support structure is located at a distal end of the bridge opposite the first rigid support structure.

13. A ramp structure as set forth in claim 1, wherein said at least one ramp unit and the bridge are integrally injection molded, and are mechanically connected to the first and second rigid support structures.

14. A ramp structure as set forth in claim 1, wherein the first and second rigid support structures have thermal expansion coefficients that are substantially equal.

15. A data storage device, comprising:
   a spindle;
   a data storage disk mounted on the spindle;
   at least one ramp unit having a load/unload ramp, the load/unload ramp and the data storage disk defining a ramp-disk spacing therebetween;
   a first rigid support structure attached to said at least one ramp unit;
   a second rigid support structure separated from the first rigid support structure;
   a bridge connecting the first and second rigid support structures; and wherein
   the first rigid support structure is made of a material having a thermal expansion coefficient selected so that the ramp-disk spacing is substantially constant during changes in temperature.

16. A data storage device as set forth in claim 15, further comprising a drive assembly having a spacer ring and a motor, wherein the thermal expansion coefficient of the first rigid support structure is substantially equal to that of the drive assembly, whereby the ramp-disk spacing is made substantially constant during changes in temperature.

17. A data storage device as set forth in claim 15, wherein the first rigid support structure and the spindle have thermal expansion coefficients that are substantially equal.

18. A data storage device as set forth in claim 15, wherein the first rigid support structure and the spindle are made of the same material.

19. A data storage device as set forth in claim 15, wherein the first rigid support structure and the disk have thermal expansion coefficients that are substantially equal.

20. A data storage device as set forth in claim 15, wherein the first rigid support structure and the disk are made of the same material.

21. A data storage device as set forth in claim 15, wherein the data storage device further comprises a spacer ring, and the first rigid support structure and the spacer ring have thermal expansion coefficients that are substantially equal.

22. A data storage device as set forth in claim 15, wherein the data storage device further comprises a spacer ring, and the first rigid support structure and the spacer ring are made of the same material.

23. A data storage device as set forth in claim 15, wherein said at least one ramp unit is made of a material selected from the group consisting of polyimide, polyacetal, PEEK, HAHN, liquid crystal polymer, and PTFE-filled plastic.

24. A data storage device as set forth in claim 15, wherein the first rigid support structure is made of a material selected from the group consisting of aluminum, steel, stainless steel, ceramic, plastic, glass-filled plastic, and carbon-filled plastic.

25. A data storage device as set forth in claim 15, wherein said at least one ramp unit and the first rigid support structure are cantilevered on the bridge.

26. A data storage device as set forth in claim 25, wherein the bridge is centrally located relative to the first rigid support structure and aligned with a central ramp unit such that ramp units are symmetrically arrayed relative to the bridge.

27. A data storage device as set forth in claim 15, wherein said at least one ramp unit is injection-molded.

28. A data storage device as set forth in claim 15, wherein said at least one ramp unit includes a separate material piece.

29. A data storage device as set forth in claim 15, wherein the second rigid support structure is located at a distal end of the bridge opposite the first rigid support structure.

30. A data storage device as set forth in claim 15, wherein said at least one ramp unit and the bridge are integrally injection molded, and mechanically connected to the first rigid support structure and the second rigid support structure.

31. A data storage device as set forth in claim 15, wherein the first and second rigid support structures have thermal expansion coefficients that are substantially equal.

* * * * *